Patented Feb. 27, 1951

2,543,544

UNITED STATES PATENT OFFICE 2,543,544

N,N-DIMETHYL-N'-(3-THIENYLMETHYL)-N'-(ALPHA-PYRIDYL)-ETHYLENEDIAMINE

Ernest E. Campaigne, Monroe County, Ind., and William Monroe Le Suer, Cuyahoga County, Ohio, assignors to Indiana University Foundation, Monroe County, Ind., a corporation of Indiana No Drawing. Application May 8, 1948,
Serial No. 25,996

2 Claims. (Cl. 260—296)

This invention relates to 3-thienylmethyl and halogenated 3-thienylmethyl derivatives of N,N-dimethyl-N'-(alpha - pyridyl) - ethylenediamine having the formula

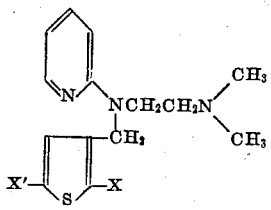

wherein X and X' are hydrogen or halogen, and water-soluble acid-addition salts thereof, useful as antihistaminic agents. As employed herein, the term halogen means chlorine, bromine and iodine.

We have discovered that compounds, where N,N-dimethyl - N' - (alpha-pyridyl)-ethylenediamine is substituted on the N' nitrogen by a 3-thienylmethyl or halogenated 3-thienylmethyl group, are antihistaminics of an unusually high activity. We have found that N,N-dimethyl-N'-(3-thienylmethyl) - N' - (alpha-pyridyl)-ethylenediamine is considerably more active than N,N-dimethyl-N'-benzyl - N' - (alpha-pyridyl)-ethylenediamine which is now a standard drug. The accepted method of evaluating antihistaminic drugs, measurement of the minimum effective dilution of the drug in counteracting the muscle contracture of isolated segments of guinea pig ileum suspended in a histamine solution, showed the first mentioned compound to be effective at a dilution ten times as great as the minimum effective dilution of the latter compound. Other tests designed to measure antihistaminic activity have also shown N,N-dimethyl - N' - (3-thienylmethyl) - N' - (alpha-pyridyl)-ethylenediamine to be a superior compound.

These substances are prepared by the reaction of N,N-dimethyl-N'-(alpha-pyridyl) - ethylenediamine and a 3-thienylmethyl halide or a halogenated 3-thienylmethyl halide in the presence of a strong base such as sodium amide. Alternatively a 3-thienylmethyl halide or halogenated 3-thienylmethyl halide can be condensed with alpha-aminopyridine, giving an alpha-(3-thienylmethylamino)-pyridine or halogenated derivative thereof. Reaction of this product with a beta-dimethylaminoethyl halide gives a product of our invention. Likewise, the unsubstituted or halogenated 3-thienylmethyl halide may be condensed with N,N-dimethylethylenediamine, and the resulting product, an N,N-dimethyl-N'-(3-thienylmethyl)-ethylenediamine reacted with an alpha-halopyridine. In brief, the fundamental starting materials are an alpha-halopyridine (or alpha-aminopyridine), a dimethylaminoethyl halide (or N,N-dimethylethylenediamine), and an unsubstituted or halogenated 3-thienylmethyl halide (or 3-thienylmethylamine), and these may be condensed in any order desired. It is preferred, however, to introduce the thienyl radical into the molecule last, because the presence of this group lowers somewhat the stability of a compound, and increases the likelihood of deleterious side reactions in subsequent steps.

When used as pharmacological agents, our compounds are ordinarily used in the form of water-soluble salts, derived from inorganic or organic acids, the anions of which are nontoxic and otherwise innocuous to the animal organism at the dosage levels required for therapeutic results. Examples of such acids include hydrochloric acid, hydrobromic acid, hydriodic acid, sulfuric acid, citric acid, tartaric acid, etc.

The following examples will illustrate our invention more fully.

*Example 1*

(a) *3-thienylmethyl bromide.*—To a solution of 55 g. (0.56 mole) of 3-methylthiophene in 150 cc. of carbon tetrachloride was added 88.5 g. (0.5 mole) of N-bromosuccinimide and 0.2 g. of benzoyl peroxide. The flask was shaken vigorously to disperse the peroxide and heating of the flask was commenced. During the first 10 minutes of heating an additional 0.2 g. of benzoyl peroxide was added, and the flask and contents were shaken vigorously at frequent intervals during the first hour of heating. The mixture was refluxed for five additional hours. After cooling in an ice bath, the succinimide was removed by suction filtration and washed with 50 cc. of carbon tetrachloride. The solutions from two identical runs were combined at this point and the carbon tetrachloride was removed at reduced pressure. The remaining highly lachrymatory oil was distilled in vacuo and 114 g. of material was collected at 70–100° C. (2 mm.). Upon redistillation the best sample was collected at 75–78° C. (1 mm.); $d_4^{20}=1.635$, $n_D^{20}=1.604$.

(b) *N,N - dimethyl-N'-(alpha-pyridyl) - ethylenediamine.*—To a mixture of 23.4 g. (0.6 mole) of sodium amide and 125 cc. of dry toluene at 100° C. was added a solution of 56.5 g. (0.6 mole) of 2-aminopyridine in 40 cc. of dry toluene. The mixture was stirred and heated for three hours on a steam bath and was then treated with 32.2 g. (0.3 mole) of beta-dimethylaminoethyl chloride. The mixture was then heated and stirred for an additional thirteen hours, cooled, and poured into 200 cc. of water. The water layer was saturated with potassium carbonate and the oil which separated was extracted with ether. The ether-toluene solutions were combined, dried, and the ether, toluene and excess 2-aminopyridine were removed under reduced pressure. Distillation of the residue at reduced pressure gave 24.4 g. (50%) of N,N-dimethyl - N' - (alpha - pyridyl)-ethylenediamine, B. P. 124–126° C. (5 mm.)

(c) *N,N-dimethyl-N'-(3-thienylmethyl) - N'-(alpha-pyridyl)-ethylenediamine and its monohydrochloride.*—To a stirred suspension of 3.12 g. (0.08 mole) of sodium amide in 50 cc. of dry toluene was added dropwise 12 g. (0.073 mole) of N,N-dimethyl-N'-(alpha - pyridyl)-ethylenediamine. The mixture was heated to reflux for two hours, cooled to about 50° C., and 21 g. (0.12 mole) of 3-thienylmethyl bromide was added dropwise. After addition was complete the brownish-orange mixture was refluxed for one-half hour, cooled to room temperature, and poured into 150 cc. of water. Besides the water and toluene layers a black oil formed a third layer. This black oil contained none of the desired product, probably being the quaternary compound resulting from the reaction of 3-thienylmethyl bromide with the dimethylamino group. The toluene layer was separated, extracted with 5% hydrochloric acid, and the acid extract was neutralized and saturated with potassium carbonate. The free base was extracted with ether and the ether extracts were dried over calcium sulfate. The ether was removed and the residue fractionated at reduced pressure giving 6.0 g. (31%) of N,N-dimethyl- N'-(3-thienylmethyl)-N'-(alpha - pyridyl) - ethylenediamine, B. P. 169–172° C. (1 mm.); $n_D^{20}$=1.5915.

The monohydrochloride of N,N-dimethyl-N'-(3-thienylmethyl)-N'-(alpha-pyridyl) - ethylenediamine was made in the following manner from a larger quantity of base.

106 g. of the free base was dissolved in 500 cc. of isopropyl alcohol and 34 cc. of concentrated hydrochloric acid was added. After shaking for a few minutes, the reaction mixture was set aside to crystallize. After cooling thoroughly in an ice-methanol mixture, the solid was collected by suction filtration and washed on the filter with low boiling petroleum ether. Then the salt was dried in an oven at 70° C. giving 91 g. M. P. 169.5–170° C. By concentration of the filtrates, a second crop of 13 g. was obtained (total yield 86%).

*Example 2*

(a) *2-chloro-3-thienylmethyl bromide.*—To a solution of 66 g. (0.5 mole) of 2-chloro-3-methylthiophene in 150 cc. of carbon tetrachloride was added 88.5 g. (0.5 mole) of N-bromosuccinimide and 1.0 g. of benzoyl peroxide. The mixture was heated to refluxing for eight hours, cooled, and the succinimide was removed from the lachrymatory solution by suction filtration. The succinimide was washed with 50 cc. of carbon tetrachloride and the combined filtrates were fractionated under reduced pressure. After removal of the carbon tetrachloride the product distilled at 85–92° C. (1–2 mm.) giving 81 g. (75%) of 2-chloro-3-thienylmethyl bromide; $n_D^{20}$=1.6119.

(b) *N,N - dimethyl-N'-(2-chloro-3 - thienylmethyl) -N'-(alpha-pyridyl)-ethylenediamine.*—

To a stirred suspension of 5.0 g. (0.13 mole) of sodium amide in 75 cc. of anhydrous toluene was added 20 g. (0.12 mole) of N,N-dimethyl-N'-(alpha-pyridyl)-ethylenediamine in a dropwise manner. The suspension was heated to refluxing for two hours, cooled to 50° C., and 30 g. (0.14 mole) of 2-chloro-3-thienylmethyl bromide was added in a dropwise manner. After the addition was complete stirring was continued and the mixture was heated to refluxing for 30 minutes. The mixture was then cooled and poured into 200 cc. of water. Besides the water and toluene layers, a solid, presumably a quaternary ammonium salt, separated. It was collected and dried; weight 9.6 g. The toluene layer was separated, extracted with 200 cc. of 5% hydrochloric acid in three portions, and the combined acid extracts were neutralized and saturated with solid potassium carbonate. The amine which separated was extracted with ether, and the ether extracts were dried and the ether removed on a steam bath. The residual oil was distilled at reduced pressure, giving 4.7 g. of unreacted N,N-dimethyl-N'-(alpha-pyridyl) - ethylenediamine, B. P. 100° C. (1 mm.), and 10.3 g. (28%) of N,N-dimethyl-N'-(2-chloro - 3 - thienylmethyl)-N'-(alpha-pyridyl)-ethylenediamine, B. P. 156–158° C. (1 mm.); $n_D^{20}$=1.5950.

*Example 3*

(a) *2-bromo-3-thienylmethyl bromide.*—To a solution of 88.5 g. (0.5 mole) of 2-bromo-3-methylthiophene and 150 cc. of carbon tetrachloride was added 88.5 g. (0.5 mole) of N-bromosuccinimide and 1.0 g. of benzoyl peroxide. The mixture was heated to refluxing for eight hours, cooled, and the succinimide removed from the 2-bromo-3-thienylmethyl bromide solution by suction filtration. The succinimide was washed with 50 cc. of carbon tetrachloride and the combined filtrates were fractionated under reduced pressure. After removal of the carbon tetrachloride the product distilled at 105–120° C. (7 mm.), the main portion distilling at 113° C. (7 mm.), giving 84.3 g. (65%) of 2-bromo-3-thienylmethyl bromide.

(b) *N,N - dimethyl - N'-(2-bromo-3-thienylmethyl)-N'-(alpha-pyridyl) - ethylenediamine.*—
To a stirred suspension of 5.0 g. (0.13 mole) of sodium amide in 75 cc. of anhydrous toluene was added 20 g. (0.12 mole) of N,N-dimethyl-N'-(alpha-pyridyl)-ethylenediamine in a dropwise manner. The suspension was heated to refluxing for two hours, cooled to 50° C., and 36 g. (0.14 mole) of 2-bromo-3-thienylmethyl bromide was added also in a dropwise manner. After the addition was complete the solution was allowed to stand at room temperature without further heating for 30 minutes. The mixture was poured into 200 cc. of water and a heavy tar separated along with the toluene and water layers. This tar was presumably a quaternary ammonium salt. The toluene layer was separated, extracted with 200 cc. of 5% hydrochloric acid in three portions, and the combined acid extracts were neutralized and saturated with solid potassium carbonate. The amine which separated was extracted with ether, the ether extracts dried over calcium sulfate, and the ether removed on a steam bath. The residual oil was distilled at reduced pressure, giving 4.7 g. of unreacted N,N - dimethyl - N' - (alpha - pyridyl)-ethylenediamine and 8.3 g. (20%) of N,N-dimethyl - N' - (2 - bromo-3-thienylmethyl)-N'-

(alpha - pyridyl) - ethylenediamine, B. P. 177–179° C. (1 mm.); $n_D^{20}=1.6590$.

*Example 4*

(a) *2,5 - dichloro-3-methylthiophene.*—To 296 g. (3.0 mole) of 3-methylthiophene in a 1-liter, 3-necked flask, fitted with a dropping funnel and an efficient condenser, was added 810 g. (6.0 mole) of sulfuryl chloride in a dropwise manner over a period of three hours. Spontaneous refluxing commenced and continued throughout the addition. A clear red solution was obtained after the addition was complete and refluxing had subsided. The solution was then heated to refluxing for two hours and then fractionally distilled at reduced pressure, giving 31.0 g. of 2-chloro-3-methylthiophene, B. P. 50° C. (16 mm.); $n_D^{20}=1.5408$. The main product, 2,5-dichloro-3-methylthiophene, distilled at 44° C. (1 mm.) or 65° C. (11 mm.); $n_D^{20}=1.5560$, and amounted to 316 g. (63%).

(b) *2,5 - dichloro-3-thienylmethyl bromide.*—To a solution of 83.5 g. (0.5 mole) of 2,5-dichloro-3-methylthiophene in 150 cc. of carbon tetrachloride was added 1.0 g. of benzoyl peroxide and 88.5 g. (0.5 mole) of N-bromosuccinimide. The material was cautiously heated to refluxing (the reaction is very vigorous at first) and heating was continued for ten hours. The yellow filtrate was then removed and the succinimide was washed with 50 cc. of carbon tetrachloride. The solvent was removed at reduced pressure and the product fractionated at reduced pressure, giving 84.7 g. (69%) of 2,5-dichloro-3-thienylmethyl bromide, B. P. 104.5–106° C. (4 mm.);

$n_D^{20}=1.6177$ (c) *N,N - dimethyl - N' - (alpha-pyridyl) - N'-(2,5 - dichloro - 3 - thienylmethyl) - ethylenediamine.*—To a stirred suspension of 5.0 g. (0.128 mole) of sodium amide in 75 cc. of anhydrous toluene was added dropwise with stirring 18 g. (0.109 mole) of N,N - dimethyl - N' - (alpha-pyridyl)-ethylenediamine. The resulting mixture was refluxed for two hours, cooled to 50° C., and 30 g. (0.127 mole) of 2,5-dichloro-3-thienylmethyl bromide in 25 cc. of anhydrous toluene was added dropwise over a period of 30 minutes. The solution was stirred for 15 minutes more and was then poured into 200 cc. of cold water. The mixture was thoroughly stirred and the toluene layer was separated from the water and a residue of tarry material, which is probably a quaternary ammonium salt. The toluene layer was washed once with 100 cc. of water and was then extracted with 200 cc. of 5% hydrochloric acid in three portions. The combined acid extracts were neutralized and saturated with solid potassium carbonate, and the dark oil which separated was extracted with ether. After drying and removal of the ether, distillation of the residual oil gave 12.4 g. (38%) of N,N'-dimethyl-N'-(alpha-pyridyl) - (2,5 - dichloro - 3 - thienylmethyl)-ethylenediamine, B. P. 177–181° C. (1 mm.); $n_D^{20}=1.5968$.

We claim:

1. N,N-dimethyl - N' - (3-thienylmethyl)-N'-(alpha - pyridyl)-ethylenediamine having the formula

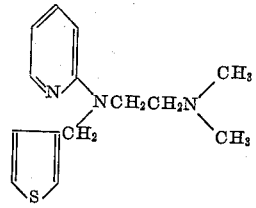

and water-soluble acid-addition salts thereof.

2. The process of preparing N,N-dimethyl-N' - (3 - thienylmethyl)-N'-alpha-pyridyl)-ethylenediamine having the formula

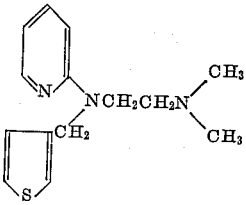

which comprises reacting N,N-dimethyl-N'-(alpha-pyridyl)-ethylenediamine with 3-thienylmethyl bromide in the presence of a strong base under anhydrous conditions.

ERNEST E. CAMPAIGNE.
WILLIAM MONROE LE SUER.

REFERENCES CITED

The following references are of record in the file of this patent.

UNITED STATES PATENTS

| Number | Name | Date |
|---|---|---|
| 1,818,075 | Luettringhaus et al. | Aug. 11, 1931 |
| 1,936,547 | Bockmuhl et al. | Nov. 21, 1933 |
| 2,406,594 | Djerassi et al. | Aug. 27, 1946 |
| 2,453,564 | Baker | Nov. 9, 1948 |

OTHER REFERENCES

Clapp et al.: J. Am. Chem. Soc., 69, 1549 (1947).